US011400819B2

(12) United States Patent
Ohara et al.

(10) Patent No.: US 11,400,819 B2
(45) Date of Patent: Aug. 2, 2022

(54) HYBRID ELECTRIC VEHICLE, AND LITHIUM ION SECONDARY BATTERY CELL SELECTION METHOD FOR HYBRID ELECTRIC VEHICLE

(71) Applicant: Envision AESC Japan Ltd., Kanagawa (JP)

(72) Inventors: Kenji Ohara, Kanagawa (JP); Shin Tanaka, Kanagawa (JP); Fumihiro Kawamura, Kanagawa (JP); Masanori Aoyagi, Kanagawa (JP); Junko Nishiyama, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 986 days.

(21) Appl. No.: 16/084,967

(22) PCT Filed: Dec. 9, 2016

(86) PCT No.: PCT/JP2016/086680
§ 371 (c)(1),
(2) Date: Sep. 13, 2018

(87) PCT Pub. No.: WO2017/158960
PCT Pub. Date: Sep. 21, 2017

(65) Prior Publication Data
US 2019/0084399 A1 Mar. 21, 2019

(30) Foreign Application Priority Data
Mar. 16, 2016 (JP) .............................. JP2016-052795

(51) Int. Cl.
*B60L 50/64* (2019.01)
*B60K 6/547* (2007.10)
(Continued)

(52) U.S. Cl.
CPC ................ *B60L 50/64* (2019.02); *B60K 6/28* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

| 2011/0206988 A1 | 8/2011 | Tanaka et al. |
| 2014/0265554 A1 | 9/2014 | Yang et al. |
| 2017/0187203 A1* | 6/2017 | Ikeda .................. G01R 31/389 |

FOREIGN PATENT DOCUMENTS

| JP | 2000-040528 A | 2/2000 |
| JP | 2003-070102 A | 3/2003 |

(Continued)

OTHER PUBLICATIONS

International Search Report issued in corresponding International Patent Application No. PCT/JP2016/086680 dated Mar. 14, 2017.

*Primary Examiner* — Wyatt P McConnell
(74) *Attorney, Agent, or Firm* — Morgan, Lewis & Bockius LLP

(57) ABSTRACT

Provided is a hybrid electric vehicle in which, in accordance with the system side of the vehicle including a fuel economy-emphasized system, a wide use-range of the SOC of a lithium ion secondary battery cell can be utilized.

6 Claims, 6 Drawing Sheets

(51) Int. Cl.
  *H01M 4/505* (2010.01)
  *H01M 4/525* (2010.01)
  *H01M 10/0525* (2010.01)
  *H01M 10/44* (2006.01)
  *B60L 50/16* (2019.01)
  *H01M 4/587* (2010.01)
  *B60L 50/61* (2019.01)
  *B60K 6/28* (2007.10)
  *B60K 6/48* (2007.10)
  *B60W 10/26* (2006.01)
  *H01M 4/131* (2010.01)
  *H01M 4/133* (2010.01)
  *B60W 20/13* (2016.01)

(52) U.S. Cl.
  CPC .............. *B60L 50/16* (2019.02); *B60L 50/61* (2019.02); *B60W 10/26* (2013.01); *B60W 20/13* (2016.01); *H01M 4/131* (2013.01); *H01M 4/133* (2013.01); *H01M 4/505* (2013.01); *H01M 4/525* (2013.01); *H01M 4/587* (2013.01); *H01M 10/0525* (2013.01); *H01M 10/44* (2013.01); *H01M 2220/20* (2013.01); *Y02E 60/10* (2013.01); *Y02T 10/62* (2013.01); *Y02T 10/70* (2013.01); *Y02T 10/7072* (2013.01)

(56) References Cited

FOREIGN PATENT DOCUMENTS

| | | |
|---|---|---|
| JP | 2004-111242 A | 4/2004 |
| JP | 2006-020481 A | 1/2006 |
| JP | 2006-033961 A | 2/2006 |
| JP | 2007-171044 A | 7/2007 |
| JP | 2010-211990 A | 9/2010 |
| JP | 2011-175933 A | 9/2011 |
| JP | 2011-189768 A | 9/2011 |
| JP | 2012-120372 A | 6/2012 |
| JP | 2013-085390 A | 5/2013 |
| JP | 2013-187021 A | 9/2013 |
| JP | 2014-144659 A | 8/2014 |
| WO | 2014/027389 A1 | 2/2014 |
| WO | 2014/133070 A1 | 9/2014 |

* cited by examiner (a)

(b)

HYBRID ELECTRIC VEHICLE, AND LITHIUM ION SECONDARY BATTERY CELL SELECTION METHOD FOR HYBRID ELECTRIC VEHICLE

TECHNICAL FIELD

The present invention relates to a hybrid electric vehicle which uses a motor and an engine in combination to drive the vehicle.

BACKGROUND ART

A lithium ion secondary battery cell includes a power generating element in which a positive electrode and a negative electrode having active material for lithium intercalation and deintercalation are laminated with a separator interposed therebetween. The lithium ion secondary battery cell is a laminated battery cell which includes an insulating package in which the power generating element is housed, together with an electrolytic solution (see Patent Document 1, for example).

Recently, lithium ion secondary battery cells have a high battery cell voltage and high output characteristics compared with nickel metal hydride battery cells and lead acid battery cells. Accordingly, lithium ion secondary battery cells are being used as a high-output power supply for hybrid electric vehicles in which a motor and an engine are used in combination to drive the vehicle.

When a lithium ion secondary battery cell is used for high output uses, a large current and good output characteristics are required. Patent Document 1 indicates that by using a mix layer having a predetermined film thickness, for example, it becomes possible to provide a lithium ion battery cell which has excellent output characteristics at large current, and which is applicable for high output uses.

CITATION LIST

Patent Literature

Patent Document [0003]
PATENT LITERATURE 1: JP-A-2011-175933

SUMMARY OF INVENTION

Problems to be Solved by the Invention

However, hybrid electric vehicles require, as a lithium ion secondary battery cell (which may be hereafter simply referred to as "the battery cell"), a battery cell from which as high an efficiency as possible within a limited volume can be obtained in accordance with input/output demands from the system side.

That is, even if battery cells having excellent output characteristics at large current are simply mounted, there is the issue of "compatibility" between the actual vehicle-side system and the actual battery cells. Accordingly, the mounted battery cells may not necessarily provide the maximum efficiency with respect to the input/output demands from the vehicle-side system.

For example, in a hybrid electric vehicle, an output-emphasized system may be adopted in order to provide comfortable sport-type travel while valuing fuel economy. In the output-emphasized system, a maximum output demand with respect to a battery cell is set to a greater value than a maximum input demand. Thus, when the system side of the vehicle demands a high output from the battery cell side, if the battery cell side is unable to fully respond to the demanded output, it may become difficult to provide the user with comfortable traveling performance.

In contrast, in general hybrid electric vehicles, emphasis is put on fuel economy (to suppress wasteful engine operation). In this case, a good input/output balance is important. Accordingly, on the system side of the vehicle, the maximum output demand and the maximum input demand with respect to the battery cells are set at relatively close values (this may be hereafter referred to as a "fuel economy-emphasized system"). Thus, in the fuel economy-emphasized system, it is important that charging by regeneration can be performed in a wide range of the SOC of the lithium ion secondary battery cells, rather than response performance with respect to a demanded output.

Accordingly, an object of the present invention is to provide a hybrid electric vehicle which is adapted for a vehicle having a fuel economy-emphasized system, and which makes it possible to utilize a wide use-range of the SOC of a lithium ion secondary battery cell within a limited volume, i.e., to perform charging by regeneration in a wide range of SOC.

Another object of the present invention is to provide a lithium ion secondary battery cell selection method which makes it possible to utilize a wide use-range of the SOC of a lithium ion secondary battery cell within a limited volume, in accordance with a vehicle-side system.

Solution to the Problems

In a hybrid electric vehicle according to an embodiment of the present invention, on the system side of the vehicle, the value ($W_{out}/W_{in}$) of the ratio of a maximum output demand $W_{out}$ to a maximum input demand $W_{in}$ with respect to a lithium ion secondary battery cell is set at less than 1.5. Thus, the system of the vehicle may be referred to as a fuel economy-emphasized system.

Meanwhile, the mounted lithium ion secondary battery cell has a maximum input value $P_{in}$ and a maximum output value $P_{out}$ which, together with the maximum input demand $W_{in}$ and the maximum output demand $W_{out}$, satisfy the following expression:

$$(P_{in}+P_{out})/3 < (W_{in}+W_{out}) \quad \text{(Expression 1)}$$

In addition, the lithium ion secondary battery cell includes a positive electrode active material layer including not less than 80 mass % of a ternary material Li(Ni—Mn—Co)O$_2$ in which a portion of the cobalt of the lithium cobaltate is substituted with nickel and manganese. The battery cell also includes a negative electrode active material layer including not less than 80 mass % of graphite.

Effects of the Invention

The hybrid electric vehicle according to an embodiment of the present invention includes a lithium ion secondary battery cell which satisfies the range defined by (Expression 1) in accordance with a maximum demanded input/output ratio of a fuel economy-emphasized system, and which includes active material layers of both electrodes having predetermined configurations that are set. Accordingly, the hybrid electric vehicle can utilize a wide use-range of the SOC of the battery cell in accordance with the input/output demands on the system side. That is, charging by regeneration can be performed in a wide range of SOC.

In addition, the lithium ion secondary battery cell selection method according to an embodiment of the present invention includes selecting, in accordance with the maximum demanded input/output ratio on the vehicle system side, a lithium ion secondary battery cell which includes active material layers of both electrodes having predetermined configurations that are set so that the use range with respect to the SOC of the battery cell becomes wider than a target value. Accordingly, a battery cell having good compatibility with the system can be selected. Thus, by mounting the selected battery cell in the vehicle, it becomes possible to utilize a wide use-range of the SOC of the lithium ion secondary battery cell in accordance with the vehicle-side system and within a limited volume.

DESCRIPTION OF THE EMBODIMENTS

In the following, an embodiment of a hybrid electric vehicle according to the present invention, examples and comparative examples of a lithium ion secondary battery cell for a battery mounted in a hybrid electric vehicle, and a lithium ion secondary battery cell selection method will be described with reference to the drawings, as appropriate. The hybrid electric vehicle of the present embodiment is an example provided with a fuel economy-emphasized system in which an input demand and an output demand with respect to the battery of a vehicle-side system are set at relatively close values.

The drawings are schematic drawings. Accordingly, it is to be noted that the relationships, ratios and the like between thicknesses and planar dimensions may be different from their actual relationships or ratios. The drawings may include portions of which the dimensional relationships or ratios may be different between the drawings. The embodiment and comparative examples indicated below illustrate devices and methods for embodying the technical concept of the present invention. Accordingly, the materials, shapes, structures, arrangements and the like of the constituent components relating to the technical concept of the present invention are not limited to those of the embodiment.

Configuration of Hybrid Electric Vehicle

[Drive System Configuration]

The configuration of the drive system (power train) of the hybrid electric vehicle will be described.

Figure 1:
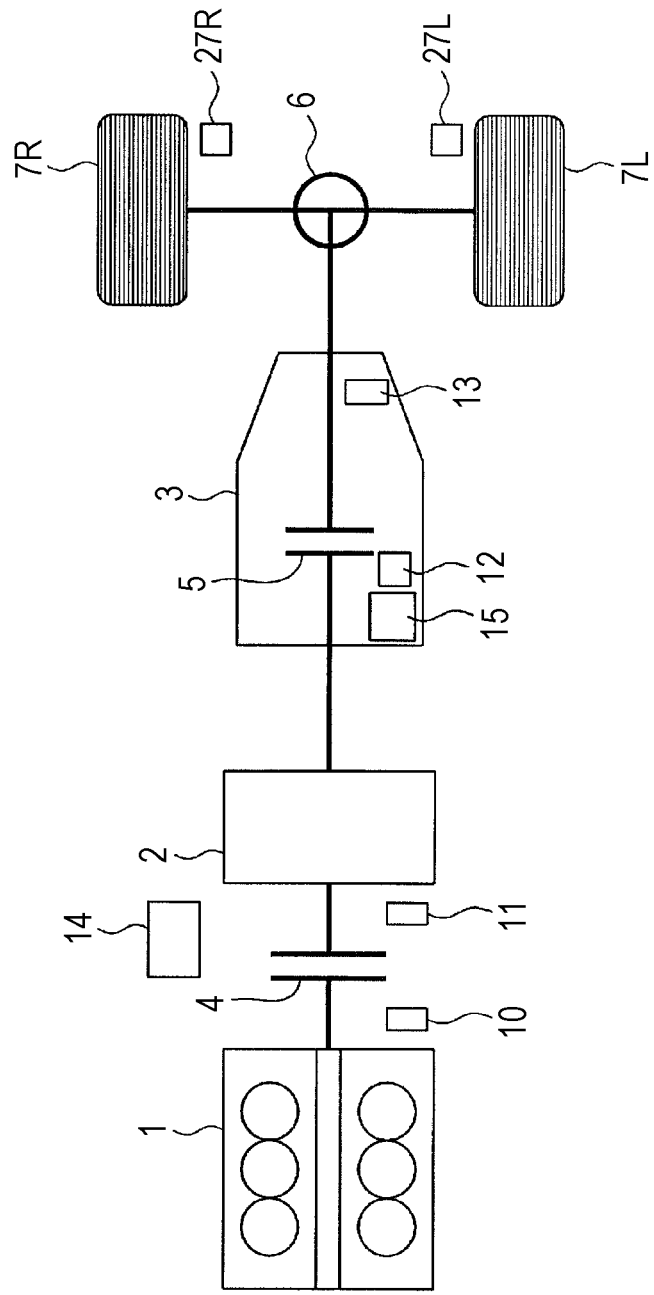
FIG. 1 is a schematic configuration diagram of an embodiment of a hybrid electric vehicle according to the present invention.

In the present embodiment, the drive system, as illustrated in FIG. 1, includes: an engine 1 which is an internal combustion engine; a generator 2 connected to the engine 1 via a first clutch 4; and an automatic transmission (AT) 3. The first clutch 4 is a hydraulic single-plate clutch, for example. The engine 1 is provided with an engine rotation sensor 10 as a rotation number detecting sensor. The generator 2 includes an MG rotation sensor 11 as a rotation number detecting sensor. The engine 1 controls the valve opening degree of a throttle valve, for example, on the basis of a control command from an engine controller 22 illustrated in FIG. 2.

The automatic transmission 3 includes a second clutch 5. To the front and rear of the second clutch 5, respectively, there are provided an AT input rotation sensor 12 and an AT output rotation sensor 13 as rotation number detecting sensors for the input and output shafts, respectively. The second clutch 5 is a hydraulic multi-plate clutch, for example. The automatic transmission 3 switches its transmission ratio automatically on the basis of a control command from an integrated controller 21 illustrated in FIG. 2.

The generator 2, for example, is a synchronous motor which includes permanent magnets embedded in a rotor and a stator coil wound on a stator. The generator 2 is coupled with left and right drive wheels 7L, 7R via the second clutch 5 and a differential gear 6. Thus, a torque transmission path is configured. The wheels 7L, 7R, which serves as drive wheels, each include a brake unit (not illustrated). A braking force is provided to a corresponding wheel in accordance with a command from a brake controller 25 illustrated in FIG. 2.

The generator 2 is controlled with the application of three-phase alternating currents produced by an inverter 8, which will be described later, on the basis of a control command from a motor controller 23 illustrated in FIG. 2. The generator 2 operates as an electric motor which is rotationally driven in response to a supply of electric power from a battery 9 illustrated in FIG. 2 (the state being referred to as "power running").

When the rotor is being rotated by external force, the generator 2 functions as an electrical generator which generates an electromotive force across the ends of the stator coil, and thereby charges the battery 9 (the operation state being referred to as "regeneration"). The rotor of the generator 2 is coupled with the input shaft of the automatic transmission 3 via a damper (not illustrated).

The first clutch 4 is placed, on the basis of a control command from the integrated controller 21, in engaged state or disengaged state by using a control hydraulic pressure supplied from a first hydraulic pressure unit 14 so as to provide a target clutch transmission torque that is input. The first hydraulic pressure unit 14 controls the hydraulic pressure supplied to the first clutch 4 in accordance with a command signal (control current) from an AT controller 24 illustrated in FIG. 2. The hydraulic pressure units 14, 15 include respective oil passageways each fitted with a hydraulic pressure sensor (not illustrated) for detecting the hydraulic pressure supplied to each of the clutches 4, 5. Information about the hydraulic pressures detected by the hydraulic pressure sensors is output to the AT controller 24.

In the automatic transmission 3, the second clutch 5 is placed, on the basis of a control command from the integrated controller 21, in engaged state or disengaged state by using a control hydraulic pressure supplied from the second hydraulic pressure unit 15 so as to provide a target clutch transmission torque. The second hydraulic pressure unit 15 controls the hydraulic pressure supplied to the second clutch 5 in accordance with a command signal (control current) from the AT controller 24.

[Control System Configuration]

The configuration of a control system for the hybrid electric vehicle will be described.

Figure 2:
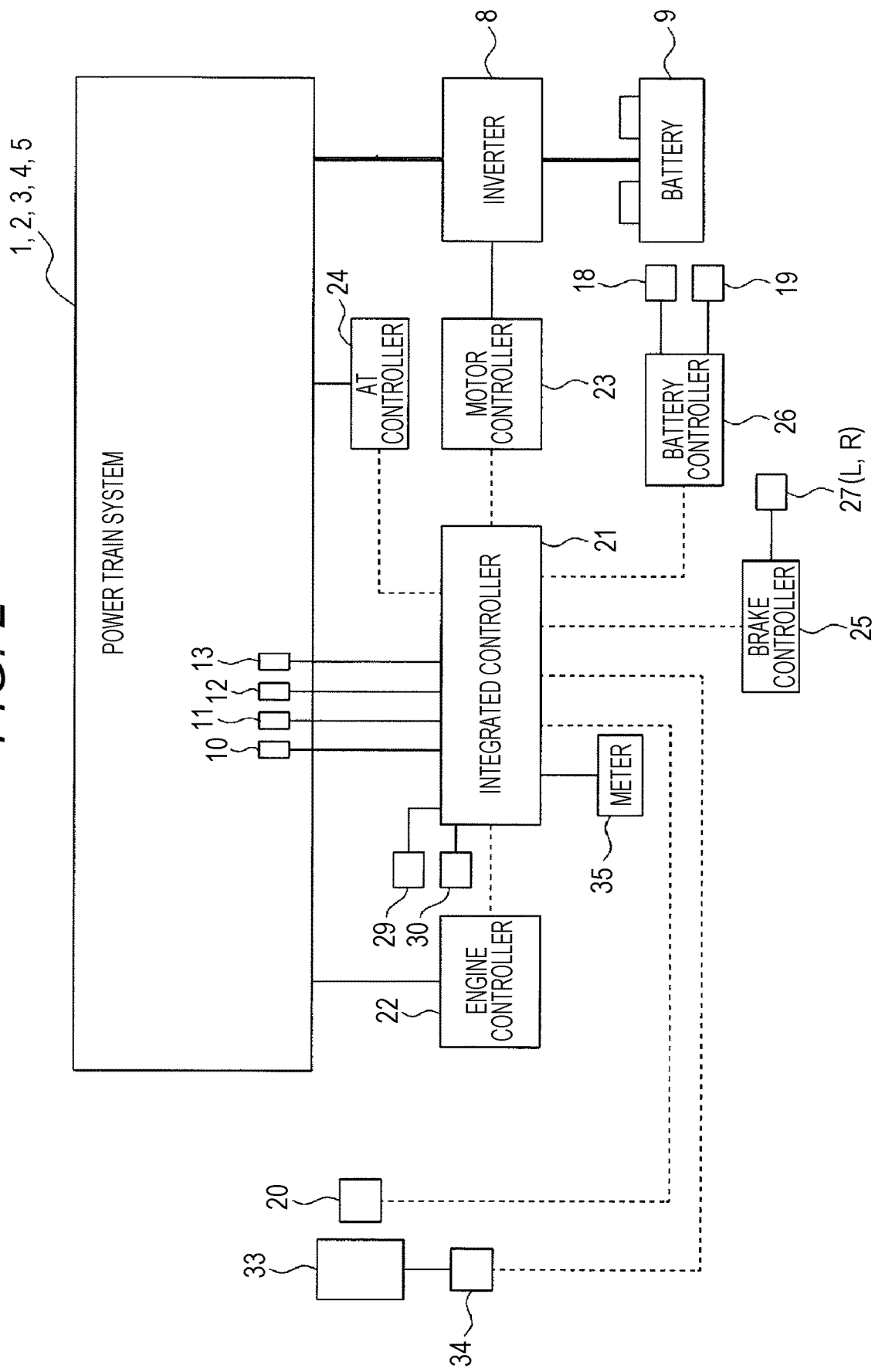
FIG. 2 is a diagram illustrating a configuration example of a hybrid system according to the present invention.

The control system, as illustrated in FIG. 2, includes an inverter 8, the battery 9, and the integrated controller 21. The integrated controller 21 is connected with the engine controller 22, the motor controller 23, the AT controller 24, the brake controller 25, and a battery controller 26 via a CAN communication line enabling mutual exchange of information.

The integrated controller 21 is also connected with the sensors 10, 11, 12, and 13 of the above-mentioned drive system. In addition, the integrated controller 21 is connected via signal lines with an accelerator sensor (APO sensor) 20, a brake switch 29 for detecting the operation of a brake pedal (not illustrated), and a meter 35 for displaying necessary information, such as travel state, to the operator.

The accelerator sensor 20 is a sensor for detecting the accelerator opening degree of an accelerator pedal 33. The accelerator sensor 20 outputs information about the detected accelerator opening degree to the integrated controller 21. The brake controller 25 is connected with wheel speed sensors 27L, 27R. The wheel speed sensors 27L, 27R, as illustrated in FIG. 1, are provided so as to be able to detect the wheel speed of each of the left and right drive wheels 7L, 7R (such as pulse signals indicating the frequency or rotation period corresponding to the rotation speed of the wheels). The wheel speed sensors 27L, 27R output information about the detected wheel speeds to the brake controller 25. Vehicle speed information determined from the wheel speed information is output from the brake controller 25 to the integrated controller 21.

The battery controller 26 is fitted with a voltage sensor 18 and a current sensor 19. The voltage sensor 18 is a sensor for detecting the voltage of the battery 9. The voltage sensor 18 outputs information about the detected voltage to the battery controller 26. The current sensor 19 is a sensor for detecting the current of the battery 9. The current sensor 19 outputs information about the detected current to the battery controller 26.

The inverter 8 converts a DC current from the battery 9 into an AC current, and generates a drive current for the generator 2. The inverter 8 also converts an AC current from the generator 2 into a DC current, and generates a charge current for the battery 9. The battery 9 supplies electric power to the generator 2 via the inverter 8. The battery 9 also stores regenerative energy from the generator 2 via the inverter 8.

The integrated controller 21 receives information from the sensors 10, 11, 12, and 13 of the drive system. The integrated controller 21 also receives the accelerator opening degree information from the accelerator sensor 20, and storage state information of the battery 9 from the battery controller 26. The integrated controller 21 outputs the acquired information via the CAN communication line.

The integrated controller 21 also performs operation control for the engine 1 via a control command to the engine controller 22. Further, the integrated controller 21 performs operation control for the generator 2 via a control command to the motor controller 23. In addition, the integrated controller 21 performs, via a control command to the AT controller 24, engagement/disengagement control for the first clutch 4, and engagement/disengagement control for the second clutch 5.

The engine controller 22 acquires engine rotation number information from the engine rotation sensor 10 via the integrated controller 21. The engine controller 22 also outputs, in accordance with a target engine torque and the like from the integrated controller 21, a command for controlling the engine operating point to a throttle valve actuator (not illustrated), for example.

The motor controller 23 acquires detected information about the rotor rotation position of the generator 2 from the MG rotation sensor 11 via the integrated controller 21. The motor controller 23 outputs, in accordance with a target motor torque, a rotation number command and the like from the integrated controller 21, a command for controlling the motor operating point of the generator 2 to the inverter 8.

The AT controller 24 acquires, via the integrated controller 21, sensor information from the respective hydraulic pressure sensors detecting the hydraulic pressures supplied to the first clutch 4 and the second clutch 5. The AT controller 24, in accordance with the accelerator opening degree information, vehicle speed information, and first and second clutch control commands (a target first clutch torque and a target second clutch torque) from the integrated controller 21, outputs a control command for controlling the engagement and disengagement of the second clutch 5 to the second hydraulic pressure unit 15. The AT controller 24 also outputs a control command for controlling the engagement and disengagement of the first clutch 4 to the first hydraulic pressure unit 14.

The brake controller 25 acquires sensor information from the wheel speed sensors 27L, 27R detecting the wheel speed of each wheel, for example. The brake controller 25 then computes a target deceleration at preset control cycles on the basis of the demanded amount of braking based on the amount of stroke of the brake pedal, for example, and the vehicle speed. Then, the brake controller 25 performs regeneration coordination brake control with respect to the demanded amount of braking, on the basis of a regeneration coordination control command from the integrated controller 21. In this way, braking force allocation is performed with respect to a regeneration brake demand torque and a target hydraulic braking force as mechanical braking force (hydraulic braking force).

The battery controller 26 monitors a battery SOC indicating the charge state of the battery 9. The battery controller 26 outputs battery SOC information, as control information and the like for the generator 2, to the integrated controller 21 via the CAN communication line. The battery 9 has a stack including a plurality of battery modules which are laid one upon another in a plurality of stages. The battery 9 is housed in a pack case. The stack is configured to be equipped with a plurality of lithium ion secondary battery cells 9A illustrated in FIG. 3.

In the hybrid electric vehicle, if the battery SOC is decreased when the vehicle is stopped, the integrated controller 21 starts the engine 1 to generate electric power and charge the battery 9. When the battery SOC reaches a normal range, the integrated controller 21 controls the first clutch 4 and the second clutch 5 to place the first clutch 4 in engaged state and the second clutch 5 in disengaged state, and stops the engine 1. When starting by using the engine 1, the integrated controller 21, in accordance with the accelerator opening degree and the battery SOC state, causes the generator 2 to be rotated and switched to power running/power generation.

During motor travel (EV mode), the integrated controller 21 ensures a motor torque and a battery output necessary for engine starting. If the motor torque or the battery output is lacking, the travel mode transitions to engine travel. The travel mode also transitions from motor travel to engine travel (HEV mode) when, for example, the vehicle speed becomes a predetermined vehicle speed or more that has been set on the basis of a preset map or the like.

During engine travel, the integrated controller 21 assists for an engine torque delay by using the generator 2 to improve the response when the accelerator pedal is depressed. That is, during engine travel, only the power of the engine 1, or the power of both the engine 1 and the generator 2 is used for travel.

At the time of deceleration by brake ON, the integrated controller 21 obtains, by using regeneration coordination brake control, a deceleration force corresponding to the operator's brake operation. At the time of shifting during engine travel or motor travel, the integrated controller 21, in order to match the numbers of rotations associated with the shifting during acceleration or deceleration, causes the generator 2 to perform regeneration/power running, thereby performing smooth shifting without using a torque converter.

Thus, the integrated controller 21 manages energy consumption by the vehicle as a whole by receiving data from the above-mentioned various sensors and controllers and performing processing to calculate the respective command values. The integrated controller 21 also performs, in an integrated manner, control to allow the vehicle to travel with the highest efficiency as a target value.

In the present embodiment, the integrated controller 21 is equipped with a fuel economy-emphasized system in which, as input/output demand values with respect to the battery 9 in the vehicle-side system, the values of a maximum input demand and a maximum output demand are set to be relatively close to each other.

Specifically, the integrated controller 21 includes a control program in which the value ($W_{out}/W_{in}$) of the ratio of a maximum output demand $W_{out}$ to a maximum input demand $W_{in}$ with respect to the battery 9 is set at less than 1.5. The integrated controller 21, on the basis of the control program, performs charge/discharge control for the lithium ion secondary battery cells of the battery 9 so that 50% SOC is at the center of SOC variations. In this way, the integrated controller 21 manages the energy consumption by the vehicle as a whole.

Meanwhile, for the battery 9 mounted in the hybrid electric vehicle, lithium ion secondary battery cells suitable for the fuel economy-emphasized system are selected by taking their "compatibility" with the fuel economy-emphasized system on the vehicle side into consideration, and mounted.

Specifically, in the present embodiment, a maximum input value $P_{in}$ and a maximum output value $P_{out}$ of the lithium ion secondary battery cells constituting the battery 9, and the maximum input demand $W_{in}$, and the maximum output demand $W_{out}$ satisfy the following (Expression 1). In addition, in the present embodiment, the positive electrode active material of the lithium ion secondary battery cells constituting the battery 9 includes not less than 80 mass % of a ternary material Li(Ni—Mn—Co)O$_2$ in which a portion of the cobalt of the lithium cobaltate is substituted with nickel and manganese. Also, the negative electrode active material layer includes not less than 80 mass % of graphite.

$$(P_{in}+P_{out})/3 < (W_{in}+W_{out})$$ (Expression 1)

Configuration of Lithium Ion Secondary Battery Cell

The configuration of the lithium ion secondary battery cells adapted for the fuel economy-emphasized system used in the battery 9 will be described. Each stack of the battery 9 is provided with a plurality of lithium ion secondary battery cells. However, the following description will be made with reference to a single lithium ion secondary battery cell 9A.

Figure 3:
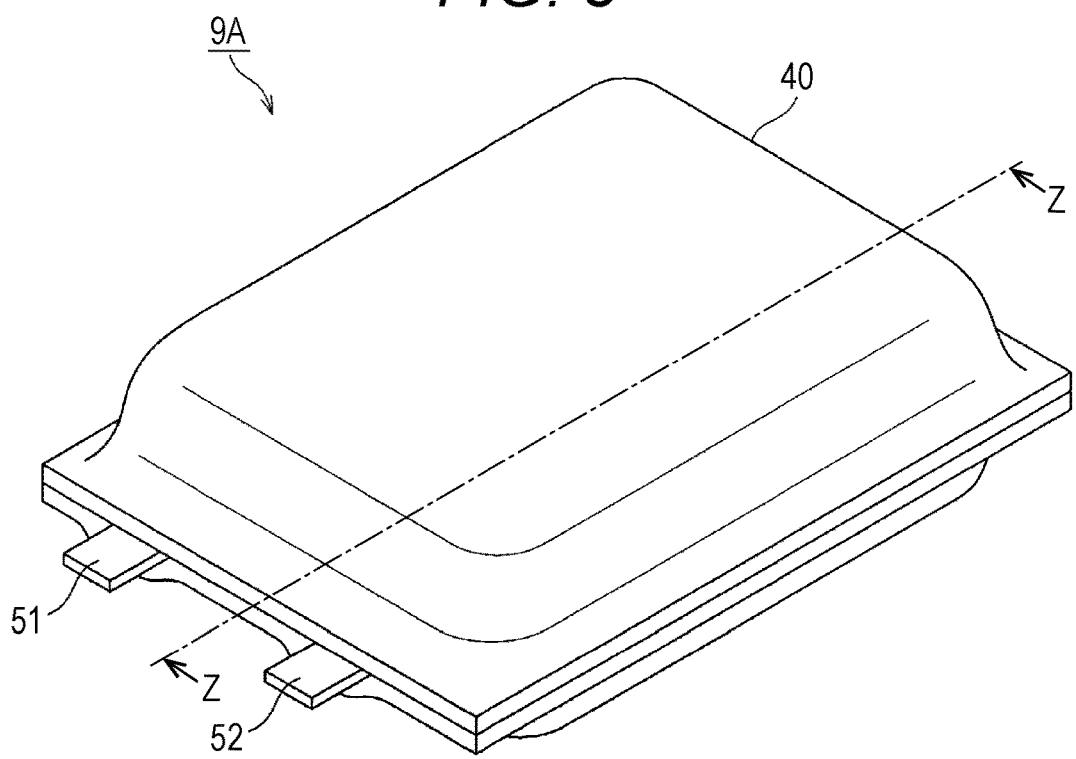
FIG. 3 is a perspective view for describing a lithium ion secondary battery cell used in the system of FIG. 2.

As illustrated in FIG. 3, the lithium ion secondary battery cell 9A (which may be hereafter simply referred to as "the battery cell") is a laminated battery cell having a substantially rectangular sheet-like exterior shape. The battery cell 9A includes a package 40 formed of a laminate film. The package 40 has a peripheral portion having a negative electrode terminal 51 and a positive electrode terminal 52. In the battery cell 9A of the present embodiment, the negative electrode terminal 51 and the positive electrode terminal 52 are disposed adjacent to each other on one side of the peripheral portion of the substantially rectangular package 40. The negative electrode terminal 51 and the positive electrode terminal 52 are respectively led out from the inside of the package 40 toward the outside in the same direction.

Figure 4:
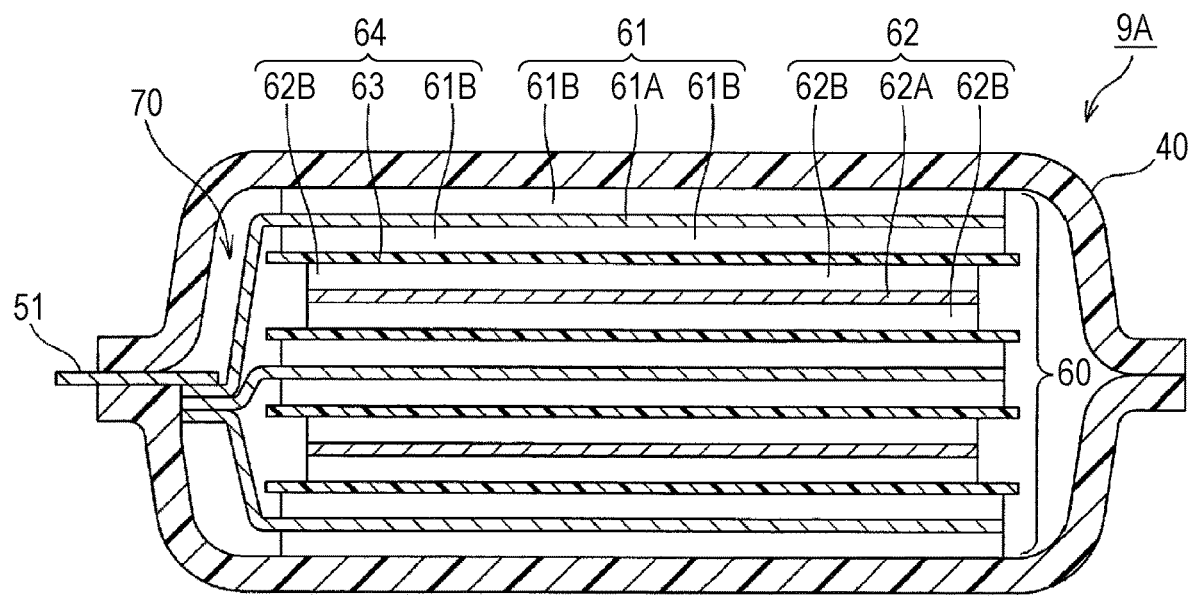
FIG. 4 is a Z-Z cross sectional view of the lithium ion secondary battery cell of FIG. 3.

The battery cell 9A, as illustrated in FIG. 4, has a power generating element 60 and an electrolytic solution 70 in the package 40. The power generating element 60 includes a negative electrode 61 and a positive electrode 62 which are laminated with a separator 63 interposed therebetween. The electrolytic solution 70 infiltrates the power generating element 60. The negative electrode 61, the positive electrode 62, and the separator 63 are film-shaped. The power generating element 60 has a flat-plate shape. The negative electrode 61, the positive electrode 62, and the separator 63 have pores. Accordingly, upon contact with the electrolytic solution 70, the negative electrode 61, the positive electrode 62, and the separator 63 are infiltrated by the electrolytic solution 70.

The power generating element 60, as illustrated in FIG. 4, has the structure in which the negative electrode 61 and the positive electrode 62 are laminated in a plurality of layers with the separator 63 interposed therebetween. The negative electrode 61 includes negative electrode active material layers 61B, 61B disposed on both major surfaces of a negative electrode current collector 61A. The negative electrode active material layers 61B contain a negative electrode active material capable of lithium ion intercalation and deintercalation. In the present embodiment, the negative electrode active material layers 61B contain not less than 80 mass % of graphite.

The positive electrode 62 includes positive electrode active material layers 62B, 62B on both major surfaces of the positive electrode current collector 62A. The positive electrode active material layers 62B contain a positive electrode active material capable of lithium ion intercalation and deintercalation. In the present embodiment, the positive electrode active material layers 62B contain not less than 80 mass % of a ternary material Li(Ni—Mn—Co)O$_2$ in which a portion of the cobalt of the lithium cobaltate is substituted with nickel and manganese. In the positive electrode active material layers 62B, the ratio of nickel (Ni) is preferably 30 to 50 mass %.

In the power generating element 60, the negative electrode active material layer 61B, the separator 63, and the positive electrode active material layer 62B that are adjacent to one another configure a single unit battery cell layer 64. Of the ends of the negative electrode terminal 51 and the positive electrode terminal 52, the terminal ends disposed in the package 40 are electrically connected, by welding, for example, to respective tab portions of the negative electrode current collector 61A and the positive electrode current collector 62A of the power generating element 60 sealed in the package 40.

Thus, in the lithium ion secondary battery cell 9A of the present embodiment, a plurality of laminated unit battery cell layers 64 are electrically connected in parallel. In the illustrated example, there is shown an electrode laminated body in which three negative electrodes 61 and two positive electrodes 62 are alternately laminated with four separators 63 interposed therebetween in a plurality of layers, for the sake of facilitating an understanding of the configuration through simplifying the drawings. However, the number of the negative electrodes 61, the positive electrodes 62, or the separators 63 is not limited to that of the illustrated example. As will be described later with reference to comparative examples and examples, in the lithium ion secondary battery cell 9A for the battery 9, the power generating element 60 includes, as the electrode laminated body, 10 layers which are laid one upon another. In particular, the value (W/Wh) of the ratio of output (W) to capacity (Wh) is set at not less than 25.

Examples and Comparative Examples of Lithium Ion Secondary Battery Cell 9A, and Method for Manufacturing the Same Examples and comparative examples of the lithium ion secondary battery cell 9A, and a method for manufacturing the same will be described.

During the manufacture of the negative electrode 61, a slurry was obtained by dispersing graphite or hard carbon as a negative electrode active material, carbon black as a conductive agent, and fluorine resin as a binder in predetermined blending amounts, in a solvent such as N-methyl-2-pyrrolidone. The slurry was applied to a copper foil (8 μm) of the negative electrode current collector 61A and dried, forming the negative electrode active material layers 61B and fabricating the negative electrode 61. The obtained negative electrode 61 may be compressed by a method using a roll press and the like for adjustment to achieve an appropriate density.

In the present embodiment, as negative electrode plates for the negative electrode 61, as shown in Table 1, there were prepared four kinds of negative electrodes 61 (negative electrode-1 to negative electrode-4) which included graphite (abbreviated as "Gr" in the tables) and hard carbon (abbreviated as "AC" in the tables) at varying content ratios. The film thickness was adjusted so that the capacity became 1.15 [mAh/cm$^2$] and the porosity became 35(%). The film thicknesses after the adjustments are also shown. In the tables, the unit [wt %] is omitted.

TABLE 1

|  | Negative electrode-1 | Negative electrode-2 | Negative electrode 3 | Negative electrode-4 |
| --- | --- | --- | --- | --- |
| Graphite (Gr) | 100 | 90 | 80 | 70 |
| Hard carbon (AC) | 0 | 10 | 20 | 30 |
| Agent/carbon black | 1 | 1 | 1 | 1 |
| Binder/PVDF | 7 | 7 | 7 | 7 |
| Film thickness (mg/cm$^2$) | 3.19 | 3.23 | 3.28 | 3.32 |
| Capacity (mAh/cm$^2$) | 1.15 | 1.15 | 1.15 | 1.15 |
| Porosity (%) | 35% | 35% | 35% | 35% |
| Single-side thickness (μm) | 22 | 24 | 25 | 26 |

During the manufacture of the positive electrode 62, a slurry was obtained by dispersing a lithium-manganese composite oxide as the positive electrode active material, a conductive agent, and a binder in predetermined blending amounts, in a solvent such as N-methyl-2-pyrrolidone. The slurry was applied to an aluminum foil (15 μm) of the positive electrode current collector 62A using a doctor blade and the like on a hot plate, and then dried, forming the positive electrode active material layers 62B and fabricating the positive electrode 62. The obtained positive electrode 62 may be compressed by a method using a roll press and the like for adjustment to achieve an appropriate density.

In the present embodiment, as positive electrode plates for the positive electrode 62, as shown in Table 2, there were prepared six kinds of positive electrode plates (positive electrode-1 to positive electrode-6) which included, in varying content ratios, a ternary material Li(Ni—Mn—Co)O$_2$ (which may be hereafter abbreviated as "NMC"; in the present embodiment, the ratios of Ni—Mn—Co were 1:1:1 (molar ratios)) in which a portion of the cobalt of the lithium cobaltate was substituted with nickel and manganese, and lithium manganate (LiMn$_2$O$_4$)(which may be hereafter simply abbreviated as "LMO"). The film thickness was adjusted so that the capacity became 1.00 [mAh/cm$^2$] and the porosity became 30(%). The film thicknesses after the adjustments are also shown. In the tables, the unit [wt %] is omitted.

TABLE 2

|  | Positive electrode-1 | Positive electrode-2 | Positive electrode-3 | Positive electrode-4 | Positive electrode-5 | Positive electrode-6 |
| --- | --- | --- | --- | --- | --- | --- |
| NMC | 100 | 80 | 60 | 40 | 20 | 0 |
| LMO | 0 | 20 | 40 | 60 | 80 | 100 |
| Agent/carbon black | 5 | 5 | 5 | 5 | 5 | 5 |
| Binder/PVDF | 5 | 5 | 5 | 5 | 5 | 5 |
| Film thickness (mg/cm$^2$) | 6.25 | 6.80 | 7.45 | 8.30 | 9.30 | 10.60 |
| Capacity (mAh/cm$^2$) | 1.00 | 1.00 | 1.00 | 1.00 | 1.00 | 1.00 |
| Porosity (%) | 30% | 30% | 30% | 30% | 30% | 30% |
| Single-side thickness (μm) | 22 | 25 | 28 | 31 | 36 | 41 |

A band-shaped separator material of a polypropylene porous film that had been prepared was cut into a rectangular shape having desired dimensions, fabricating the separator 63. When mounted on a hybrid electric vehicle, preferably, the separator 63 has a flat-plate shape with an area of not less than 75 cm².

Then, as shown in Table 3, the four kinds of negative electrode 61, the separator 63, and the above-mentioned six kinds of positive electrode 62 were combined, and a total of 24 kinds of power generating element 60 were configured (cell 1 to cell 24).

For each power generating element 60, the positive electrode 62 was cut into a rectangular shape having a size of 100 mm×100 mm, and the opposing negative electrode 61 was cut into a rectangular shape with a size of 102 mm×102 mm. Of the peripheral portion of each electrode, the end on one side was a tab portion (foil portion) for connecting the above-mentioned terminal 51, 52 and did not have the active material applied thereto.

In the present embodiment, a laminated body was obtained in which the negative electrode 61 and the positive electrode 62 were arranged on both surfaces of the separator 63 so that the both active material layers overlapped each other across the separator 63. The laminated bodies were laid one upon another in 10 layers and formed into an electrode laminated body, obtaining an individual power generating element 60. The tab portion of the positive electrode 62 of the power generating element 60 was ultrasonically welded with the positive electrode terminal 52 made of aluminum. Similarly, the tab portion of the negative electrode 61 was ultrasonically welded with the negative electrode terminal 51 made of nickel.

The power generating element 60 of cell 1 to cell 24 was enclosed in two laminate films of aluminum forming the package 40. Then, the distal ends of the negative electrode terminal 51 and the positive electrode terminal 52 were respectively arranged to protrude outside the laminate films.

In this state, the peripheral portions on the three sides other than one of the long sides were adhered to each other by thermal fusion, obtaining a bag-like package 40.

Then, a prescribed amount of an electrolytic solution 70 containing a lithium salt, such as lithium hexafluorophosphate, and an organic solvent, such as ethylene carbonate, was poured into the package 40 via an opening thereof, and vacuum impregnation was performed. The prescribed amount of the electrolytic solution 70 was a liquid amount of 145% with respect to the pores of the power generating element 60 and the separators. After the prescribed amount of the electrolytic solution 70 was poured, the opening of the package 40 was thermally fused under reduced pressure, and the package 40 was hermetically sealed.

In this way, 24 kinds of the laminate-type lithium ion secondary battery cell 9A illustrated in FIG. 3 and FIG. 4, i.e., cell 1 to cell 24, were prepared. After the respective lithium ion secondary battery cell 9A was initially charged, aging was performed at 45° C. for several days. In this way, the battery cells of the examples and the comparative examples shown in Table 3 and Table 4 were obtained.

Table 3 and Table 4 show the combinations of the positive electrode and the negative electrode constituting each of cell 1 to cell 24. Table 3 also shows cell information (thickness [mm], volume [L], average voltage [V], capacity [mAh/cm²], Wh/L, W/L) of each cell according to the corresponding combination, the maximum output [W] and the maximum input [W] at a predetermined charge amount (SOC), the maximum output/input ratio at 50% SOC, and output capacity ratio (W/Wh).

Table 4 shows, with respect to each of cell 1 to cell 24, the SOC range (Usable-range [%]) available for the combination of the cell, the SOC value [SOC %] with which a demand from the system side can be responded at an SOC output end, and the SOC value [SOC %] with which a demand from the system side can be responded at an SOC input end, with reference to input/output demands (maximum output/input ratio) from the system side.

TABLE 3

| | | Positive electrode | Negative electrode | Cell information | | | | | |
|---|---|---|---|---|---|---|---|---|---|
| | | | | Thickness | Volume | Average V | Capacity | Wh/L | W/L |
| Example 1 | Cell 1 | Positive electrode-1 | Negative electrode-1 | 1.90 | 0.027 | 3.70 | 1.62 | 219 | 7493 |
| Example 2 | Cell 2 | Positive electrode-2 | Negative electrode-1 | 1.95 | 0.028 | 3.75 | 1.64 | 219 | 7479 |
| Comparative Example | Cell 3 | Positive electrode-3 | Negative electrode-1 | 2.01 | 0.029 | 3.80 | 1.66 | 218 | 7428 |
| Comparative Example | Cell 4 | Positive electrode-4 | Negative electrode-1 | 2.08 | 0.030 | 3.85 | 1.69 | 217 | 8013 |
| Example A | Cell 5 | Positive electrode-5 | Negative electrode-1 | 2.17 | 0.031 | 3.90 | 1.69 | 211 | 8481 |
| Example B | Cell 6 | Positive electrode-6 | Negative electrode-1 | 2.29 | 0.033 | 3.95 | 1.69 | 202 | 8188 |
| Example 3 | Cell 7 | Positive electrode-1 | Negative electrode-2 | 1.93 | 0.028 | 3.69 | 1.53 | 203 | 7304 |
| Example 4 | Cell 8 | Positive electrode-2 | Negative electrode-2 | 1.98 | 0.029 | 3.74 | 1.55 | 203 | 7225 |
| Comparative Example | Cell 9 | Positive electrode-3 | Negative electrode-2 | 2.04 | 0.029 | 3.79 | 1.57 | 203 | 7149 |

TABLE 3-continued

| | | Positive | Negative | | | | | | | |
|---|---|---|---|---|---|---|---|---|---|---|
| Comparative Example | Cell 10 | Positive electrode-4 | Negative electrode-2 | 2.11 | 0.030 | 3.84 | 1.58 | | 200 | 7734 |
| Example C | Cell 11 | Positive electrode-5 | Negative electrode-2 | 2.20 | 0.032 | 3.89 | 1.58 | | 194 | 8207 |
| Example D | Cell 12 | Positive electrode-6 | Negative electrode-2 | 2.32 | 0.033 | 3.94 | 1.58 | | 186 | 7932 |
| Example 5 | Cell 13 | Positive electrode-1 | Negative electrode-3 | 1.96 | 0.028 | 3.68 | 1.44 | | 188 | 7086 |
| Example 6 | Cell 14 | Positive electrode-2 | Negative electrode-3 | 2.01 | 0.029 | 3.73 | 1.46 | | 188 | 7221 |
| Comparative Example | Cell 15 | Positive electrode-3 | Negative electrode-3 | 2.07 | 0.030 | 3.78 | 1.46 | | 185 | 7045 |
| Comparative Example | Cell 16 | Positive electrode-4 | Negative electrode-3 | 2.15 | 0.031 | 3.83 | 1.47 | | 182 | 7429 |
| Example E | Cell 17 | Positive electrode-5 | Negative electrode-3 | 2.24 | 0.032 | 3.88 | 1.47 | | 177 | 7906 |
| Example F | Cell 18 | Positive electrode-6 | Negative electrode-3 | 2.35 | 0.034 | 3.93 | 1.47 | | 171 | 7831 |
| Comparative Example | Cell 19 | Positive electrode-1 | Negative electrode-4 | 1.99 | 0.029 | 3.68 | 1.40 | | 180 | 6979 |
| Comparative Example | Cell 20 | Positive electrode-2 | Negative electrode-4 | 2.04 | 0.029 | 3.72 | 1.41 | | 179 | 6842 |
| Comparative Example | Cell 21 | Positive electrode-3 | Negative electrode-4 | 2.10 | 0.030 | 3.77 | 1.41 | | 176 | 6713 |
| Comparative Example | Cell 22 | Positive electrode-4 | Negative electrode-4 | 2.18 | 0.031 | 3.83 | 1.42 | | 173 | 6530 |
| Comparative Example | Cell 23 | Positive electrode-5 | Negative electrode-4 | 2.27 | 0.033 | 3.88 | 1.42 | | 169 | 6730 |
| Comparative Example | Cell 24 | Positive electrode-6 | Negative electrode-4 | 2.39 | 0.034 | 3.93 | 1.42 | | 162 | 6770 |

| | | | | Maximum output (W) | | | | Maximum input (W) | | | | W | |
|---|---|---|---|---|---|---|---|---|---|---|---|---|---|
| | | Positive | Negative | 20% | 30% | 40% | 50% (W output) | 50% (W input) | 60% | 70% | 80% | output/ W input | W/ Wh |
| | | electrode | electrode | 115 | 165 | 188 | 205 | 220 | 202 | 173 | 135 | 0.93 | 34 |
| Example 1 | Cell 1 | Positive electrode-1 | Negative electrode-1 | 120 | 170 | 193 | 210 | 206 | 195 | 166 | 120 | 1.02 | 34 |
| Example 2 | Cell 2 | Positive electrode-2 | Negative electrode-1 | 125 | 177 | 195 | 215 | 190 | 180 | 155 | 105 | 1.13 | 34 |
| Comparative Example | Cell 3 | Positive electrode-3 | Negative electrode-1 | 130 | 185 | 221 | 240 | 181 | 168 | 145 | 100 | 1.33 | 37 |
| Comparative Example | Cell 4 | Positive electrode-4 | Negative electrode-1 | 136 | 204 | 248 | 265 | 165 | 155 | 133 | 95 | 1.61 | 40 |
| Example A | Cell 5 | Positive electrode-5 | Negative electrode-1 | 140 | 210 | 250 | 270 | 160 | 145 | 125 | 94 | 1.69 | 40 |
| Example B | Cell 6 | Positive electrode-6 | Negative electrode-1 | 110 | 160 | 185 | 203 | 225 | 209 | 175 | 138 | 0.90 | 36 |
| Example 3 | Cell 7 | Positive electrode-1 | Negative electrode-2 | 118 | 168 | 190 | 206 | 210 | 199 | 169 | 130 | 0.98 | 36 |
| Example 4 | Cell 8 | Positive electrode-2 | Negative electrode-2 | 123 | 170 | 194 | 210 | 195 | 180 | 150 | 110 | 1.08 | 35 |
| Comparative Example | Cell 9 | Positive electrode-3 | Negative electrode-2 | 125 | 178 | 215 | 235 | 185 | 177 | 140 | 103 | 1.27 | 39 |

TABLE 3-continued

| | | Positive electrode | Negative electrode | | | | | | | | | | |
|---|---|---|---|---|---|---|---|---|---|---|---|---|---|
| Comparative Example | Cell 10 | Positive electrode-4 | Negative electrode-2 | 134 | 200 | 240 | 260 | 170 | 160 | 135 | 104 | 1.53 | 42 |
| Example C | Cell 11 | Positive electrode-5 | Negative electrode-2 | 138 | 206 | 247 | 265 | 165 | 150 | 130 | 100 | 1.61 | 43 |
| Example D | Cell 12 | Positive electrode-6 | Negative electrode-2 | 115 | 165 | 190 | 200 | 226 | 203 | 173 | 135 | 0.88 | 38 |
| Example 5 | Cell 13 | Positive electrode-1 | Negative electrode-3 | 120 | 168 | 193 | 209 | 210 | 195 | 168 | 128 | 1.00 | 38 |
| Example 6 | Cell 14 | Positive electrode-2 | Negative electrode-3 | 125 | 170 | 194 | 210 | 195 | 180 | 160 | 110 | 1.08 | 38 |
| Comparative Example | Cell 15 | Positive electrode-3 | Negative electrode-3 | 130 | 177 | 215 | 230 | 185 | 170 | 145 | 105 | 1.24 | 41 |
| Comparative Example | Cell 16 | Positive electrode-4 | Negative electrode-3 | 136 | 208 | 246 | 255 | 162 | 159 | 135 | 105 | 1.57 | 45 |
| Example E | Cell 17 | Positive electrode-5 | Negative electrode-3 | 140 | 208 | 250 | 265 | 160 | 155 | 130 | 100 | 1.66 | 46 |
| Example F | Cell 18 | Positive electrode-6 | Negative electrode-3 | 115 | 143 | 175 | 200 | 220 | 203 | 175 | 140 | 0.91 | 39 |
| Comparative Example | Cell 19 | Positive electrode-1 | Negative electrode-4 | 120 | 146 | 178 | 201 | 212 | 190 | 161 | 121 | 0.95 | 38 |
| Comparative Example | Cell 20 | Positive electrode-2 | Negative electrode-4 | 125 | 151 | 180 | 203 | 196 | 183 | 154 | 111 | 1.04 | 38 |
| Comparative Example | Cell 21 | Positive electrode-3 | Negative electrode-4 | 130 | 160 | 190 | 205 | 176 | 160 | 138 | 103 | 1.16 | 38 |
| Comparative Example | Cell 22 | Positive electrode-4 | Negative electrode-4 | 136 | 168 | 205 | 220 | 160 | 155 | 130 | 98 | 1.37 | 40 |
| Comparative Example | Cell 23 | Positive electrode-5 | Negative electrode-4 | 140 | 178 | 220 | 233 | 155 | 147 | 123 | 92 | 1.50 | 42 |
| Comparative Example | Cell 24 | Positive electrode-6 | Negative electrode-4 | 115 | 165 | 188 | 205 | 220 | 202 | 173 | 135 | 0.93 | 34 |

TABLE 4

| | | Positive electrode | Negative electrode | Usable-range (%) | | | | Output end/SOC% | | | | Input end SOC% | | | |
|---|---|---|---|---|---|---|---|---|---|---|---|---|---|---|---|
| | | | | 1:1 | 5:4 | 3:2 | 2:1 | 1:1 | 5:4 | 3:2 | 2:1 | 1:1 | 5:4 | 3:2 | 2:1 |
| Example 1 | Cell 1 | Positive electrode-1 | Negative electrode-1 | 50 | 52 | 47 | 40 | 26 | 30 | 36 | 46 | 76 | 82 | 83 | 86 |
| Example 2 | Cell 2 | Positive electrode-2 | Negative electrode-1 | 49 | 50 | 46 | 39 | 25 | 29 | 34 | 44 | 74 | 79 | 80 | 83 |
| Comparative Example | Cell 3 | Positive electrode-3 | Negative electrode-1 | 46 | 46 | 47 | 38 | 25 | 28 | 31 | 43 | 71 | 74 | 78 | 81 |
| Comparative Example | Cell 4 | Positive electrode-4 | Negative electrode-1 | 44 | 46 | 47 | 46 | 24 | 28 | 29 | 34 | 68 | 74 | 76 | 80 |
| Example A | Cell 5 | Positive electrode-5 | Negative electrode-1 | 41 | 46 | 48 | 49 | 21 | 25 | 26 | 29 | 62 | 71 | 74 | 78 |
| Example B | Cell 6 | Positive electrode-6 | Negative electrode-1 | 35 | 44 | 48 | 50 | 21 | 24 | 25 | 28 | 56 | 68 | 73 | 78 |
| Example 3 | Cell 7 | Positive electrode-1 | Negative electrode-2 | 50 | 48 | 46 | 38 | 28 | 33 | 38 | 49 | 78 | 81 | 84 | 87 |
| Example 4 | Cell 8 | Positive electrode-2 | Negative electrode-2 | 50 | 49 | 46 | 37 | 26 | 30 | 36 | 48 | 76 | 79 | 82 | 85 |

TABLE 4-continued

| | | Positive electrode | Negative electrode | Usable-range (%) | | | | Output end/SOC% | | | | Input end SOC% | | | |
|---|---|---|---|---|---|---|---|---|---|---|---|---|---|---|---|
| | | | | 1:1 | 5:4 | 3:2 | 2:1 | 1:1 | 5:4 | 3:2 | 2:1 | 1:1 | 5:4 | 3:2 | 2:1 |
| Comparative Example | Cell 9 | Positive electrode-3 | Negative electrode-2 | 45 | 45 | 43 | 38 | 25 | 30 | 35 | 44 | 70 | 75 | 78 | 82 |
| Comparative Example | Cell 10 | Positive electrode-4 | Negative electrode-2 | 44 | 44 | 45 | 45 | 24 | 28 | 30 | 36 | 68 | 72 | 75 | 81 |
| Example C | Cell 11 | Positive electrode-5 | Negative electrode-2 | 41 | 44 | 48 | 51 | 22 | 25 | 27 | 30 | 63 | 69 | 75 | 81 |
| Example D | Cell 12 | Positive electrode-6 | Negative electrode-2 | 37 | 44 | 48 | 51 | 21 | 24 | 26 | 29 | 58 | 68 | 74 | 80 |
| Example 5 | Cell 13 | Positive electrode-1 | Negative electrode-3 | 49 | 49 | 47 | 39 | 27 | 31 | 36 | 48 | 76 | 80 | 83 | 87 |
| Example 6 | Cell 14 | Positive electrode-2 | Negative electrode-3 | 48 | 48 | 47 | 40 | 26 | 30 | 35 | 45 | 74 | 78 | 82 | 85 |
| Comparative Example | Cell 15 | Positive electrode-3 | Negative electrode-3 | 45 | 46 | 44 | 38 | 26 | 29 | 34 | 44 | 71 | 75 | 78 | 82 |
| Comparative Example | Cell 16 | Positive electrode-4 | Negative electrode-3 | 46 | 44 | 45 | 45 | 22 | 28 | 31 | 36 | 68 | 72 | 76 | 81 |
| Example E | Cell 17 | Positive electrode-5 | Negative electrode-3 | 43 | 46 | 49 | 52 | 21 | 24 | 26 | 29 | 64 | 70 | 75 | 81 |
| Example F | Cell 18 | Positive electrode-6 | Negative electrode-3 | 41 | 45 | 48 | 52 | 21 | 24 | 26 | 28 | 62 | 69 | 74 | 80 |
| Comparative Example | Cell 19 | Positive electrode-1 | Negative electrode-4 | 46 | 44 | 43 | 38 | 32 | 38 | 43 | 50 | 78 | 82 | 86 | 88 |
| Comparative Example | Cell 20 | Positive electrode-2 | Negative electrode-4 | 42 | 40 | 38 | 35 | 31 | 36 | 42 | 49 | 73 | 76 | 80 | 84 |
| Comparative Example | Cell 21 | Positive electrode-3 | Negative electrode-4 | 42 | 39 | 38 | 34 | 30 | 35 | 40 | 48 | 72 | 74 | 78 | 82 |
| Comparative Example | Cell 22 | Positive electrode-4 | Negative electrode-4 | 40 | 40 | 40 | 34 | 26 | 32 | 36 | 46 | 66 | 72 | 76 | 80 |
| Comparative Example | Cell 23 | Positive electrode-5 | Negative electrode-4 | 39 | 39 | 41 | 43 | 24 | 29 | 33 | 37 | 63 | 68 | 74 | 80 |
| Comparative Example | Cell 24 | Positive electrode-6 | Negative electrode-4 | 36 | 38 | 41 | 43 | 22 | 28 | 31 | 35 | 58 | 66 | 72 | 78 |

The performance of each cell was evaluated as follows.

Initial Charge/Discharge Efficiency

Using the battery cell 9A of cell 1 to cell 24 (similarly below), during an initial charge/discharge, a constant current, constant voltage (CC-CV) charge was performed at an atmospheric temperature of 25° C. with 0.1 C current and with an upper limit voltage of 4.2 V. Thereafter, aging was performed at 45° C. for several days. Then, a constant current discharge was performed with 0.2 C current to 3.0 V. The initial charge/discharge efficiency was determined from the ratio of the discharged electrical quantity when, after a CC-CV charge was again performed up to a battery voltage of 4.2 V, discharge was performed at 0.2 C to a battery voltage of 3.0 V, to the initial charge capacity (0.2 C discharge capacity/initial charge capacity).

State of Charge (SOC)

The state of charge (SOC) refers to the value, expressed in percentage, of a charged amount with respect to the battery cell capacity in a use voltage range of each battery cell 9A. In the present example, the use voltage range of each battery cell 9A was an SOC range between 3.0 V (SOC 0%) and 4.2 V (SOC 100%).

SOC Adjustment

With respect to the capacity of each battery cell 9A determined as described above, a CC charge was performed with 0.2 C current from a state of the battery cell voltage of 3 V until a desired charged amount (SOC) was achieved. The battery cell voltage after allowing the battery to stand in this state for one hour was considered the voltage value at the desired SOC.

Measurement of SOC-OCV (State of Charge-Open Voltage)

From the state in which the battery cell voltage was 3 V, a CC charge was performed with 0.2 CC current until the SOC became X % (X=10, 20, 30, 40, 50, 60, 70, 80, 90, 100). The battery cell voltage after allowing to stand in this state for one hour was considered the value of the open voltage of the battery cell having an X % SOC-OCV (unit: V), i.e., a state of charge of X %.

Battery Cell Capacity

The product of the value (unit: V) of the above-mentioned 50% SOC-OCV and the value (unit: Ah) of the battery cell capacity due to the 0.2 c current charging (the product of the discharge current value when 0.2 C discharge was performed from 4.2 V to 3.0 V, and time) was considered the battery cell capacity (unit: Wh).

Measurement of Output

The maximum current value for reaching the lower limit voltage (3 V) in 10 seconds at 25° C. from the above-mentioned X % SOC-OCV state was measured. In this case, the product of the value of X % SOC-OCV and the maximum current value (unit: A) was considered the battery cell output (unit: W). The battery cell output when X=50 was considered the maximum output of the battery cell.

Output Capacity Ratio (W/Wh)

The output capacity ratio was calculated according to the ratio of the maximum output and capacity measured above (maximum output/capacity).

As noted above, there is "compatibility" between the actual vehicle-side system and a battery cell. Accordingly, in the present embodiment, for the hybrid electric vehicle provided with the fuel economy-emphasized system, a battery cell is selected which has good compatibility with the system side so that the use range of the SOC of the battery cell can be wider than a target value. In the following, while comparatively referring to the battery cell 9A of the above-mentioned prepared cell 1 to cell 24, a method for selecting a preferable battery cell for the fuel economy-emphasized system will be described.

Figure 5:
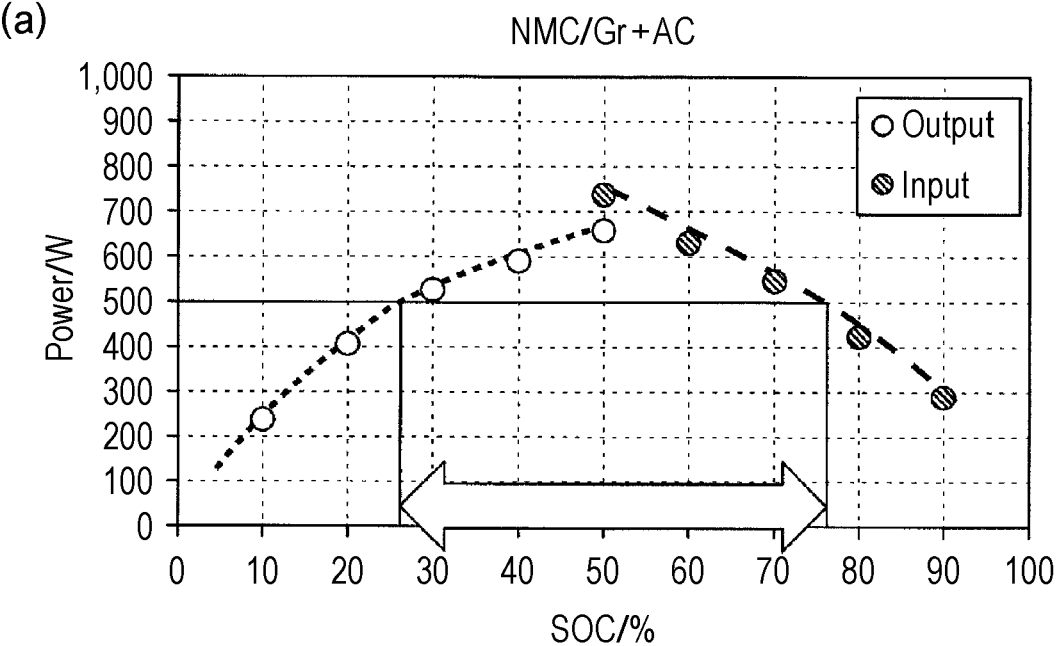
FIG. 5 illustrates an appropriate battery cell selection method according to the present invention.
Figure 5:
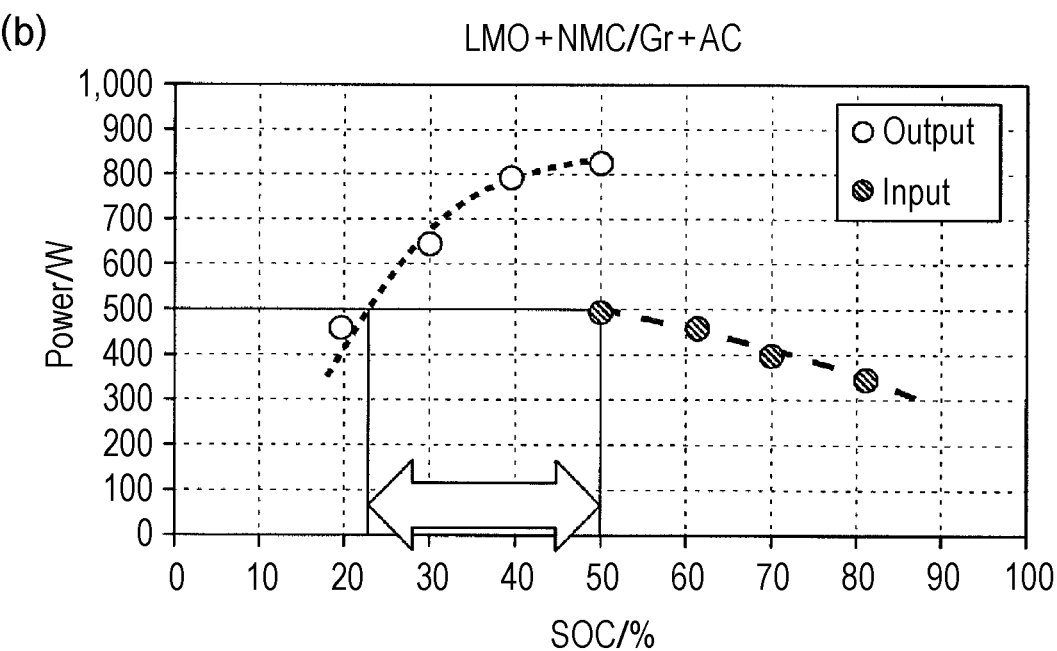

According to the appropriate battery cell selection method of the present embodiment, as comparatively illustrated in the schematic graphs (a) and (b) of FIG. 5, from the relationship between the SOC % of the battery cell to be selected and the electric power value that can be input or output with respect to the battery cell, the use range of the SOC of the battery cell is determined on the basis of a maximum demanded output and a maximum demanded input with respect to the battery cell that are set in advance on the vehicle system side.

FIG. 5(a) is a graph indicating the inclination of a battery cell including: a positive electrode active material layer mainly containing a ternary material Li(Ni—Mn—Co)O$_2$ (which may be hereafter referred to as "NMC-based") in which a portion of the cobalt of the lithium cobaltate is substituted with nickel and manganese; and a negative electrode active material layer mainly containing graphite. FIG. 5(b) is a graph indicating the inclination of a battery cell including: a positive electrode active material layer mainly containing lithium manganate (LiMn$_2$O$_4$) (which may be hereafter referred to as "LMO-based"); and a negative electrode active material layer mainly containing graphite.

In the case of the NMC-based battery cell, as illustrated in FIG. 5(a), with reference to the 50% SOC at the center, the input side (the higher SOC % side to the right in FIG. 5(a)) and the output side (the lower SOC % side to the left in FIG. 5(a)) exhibit a mountain-shaped inclination due to substantially symmetric left and right curves. On the other hand, in the case of the LMO-based battery cell, as illustrated in FIG. 5(b), the input side and the output side exhibit an asymmetric mountain-shaped inclination due the left and right curves having a vertical discrepancy such that the input side is lower and the output side is higher.

With respect to the NMC-based and LMO-based battery cells exhibiting such differing inclinations, a case is considered in which the vehicle-side system has a maximum demanded output and a maximum demanded input with respect to the battery cell which are both 500 W. This is because in the fuel economy-emphasized system, on the system side of the vehicle, the maximum output demand and the maximum input demand with respect to the battery cell are set at relatively close values.

In this case, it is seen that in the case of the NMC-based battery cell illustrated in FIG. 5(a), when the maximum demanded output is 500 W, the output side curve of the battery cell cannot respond an output demand unless the SOC is not less than approximately 26%. Meanwhile, it is seen that in the NMC-based battery cell, when the maximum demanded input is 500 W, an input demand can be responded up to approximately 76% SOC.

On the other hand, in the case of the LMO-based battery cell illustrated in FIG. 5(b), when the maximum demanded output is 500 W, the output side curve of the battery cell can respond an output demand up to approximately 23% SOC. Meanwhile, in the LMO-based battery cell, even when the maximum demanded input is 500 W, an input demand can be responded only up to 50% SOC.

Accordingly, when the battery cells of FIG. 5(a), (b) are compared, in the NMC-based battery cell illustrated in (a), a wide range of around 50% is obtained as an available SOC range. On the other hand, in the LMO-based battery cell illustrated in (b), the available SOC range is limited to a narrow range of approximately 27%. That is, in the fuel economy-emphasized system, the NMC-based battery cell illustrated in (a) can provide a wider SOC use range than the LMO-based battery cell illustrated in (b).

Thus, it is understood that the NMC-based battery cell has a better compatibility with the fuel economy-emphasized system in which the maximum output demand and the maximum input demand with respect to the battery cell are set at relatively close values. Table 5 to Table 8 and FIG. 6 to FIG. 9 illustrate the contents obtained by organizing the results shown in Table 4 on the basis of the "compatibility" analyzed above, with respect to each of cell 1 to cell 24.

TABLE 5

| | | Output:Input = 1:1 | | | | | |
|---|---|---|---|---|---|---|---|
| | | NMC LMO | | | | | |
| | | 100:0 | 80:20 | 60:40 | 40:60 | 20:80 | 0:100 |
| Gr:AC | 100:0 | 50 | 49 | 46 | 44 | 41 | 35 |
| | 90:10 | 50 | 50 | 45 | 44 | 41 | 37 |
| | 80:20 | 49 | 48 | 45 | 46 | 43 | 41 |
| | 70:30 | 46 | 42 | 42 | 40 | 39 | 36 |

TABLE 6

Output:Input = 5:4

| | | NMC | | | LMO | |
|---|---|---|---|---|---|---|
| | | 100:0 | 80:20 | 60:40 | 40:60 | 20:80 | 0:100 |
| Gr:AC | 100:0 | 52 | 50 | 46 | 46 | 46 | 44 |
| | 90:10 | 48 | 49 | 45 | 44 | 44 | 44 |
| | 80:20 | 49 | 48 | 46 | 44 | 46 | 45 |
| | 70:30 | 44 | 40 | 39 | 40 | 39 | 38 |

TABLE 7

Output:Input = 3:2

| | | NMC | | | LMO | |
|---|---|---|---|---|---|---|
| | | 100:0 | 80:20 | 60:40 | 40:60 | 20:80 | 0:100 |
| Gr:AC | 100:0 | 47 | 46 | 47 | 47 | 48 | 48 |
| | 90:10 | 46 | 46 | 43 | 45 | 48 | 48 |
| | 80:20 | 47 | 47 | 44 | 45 | 49 | 48 |
| | 70:30 | 43 | 38 | 38 | 40 | 41 | 41 |

TABLE 8

Output:Input = 2:1

| | | NMC | | | LMO | |
|---|---|---|---|---|---|---|
| | | 100:0 | 80:20 | 60:40 | 40:60 | 20:80 | 0:100 |
| Gr:AC | 100:0 | 40 | 39 | 38 | 46 | 49 | 50 |
| | 90:10 | 38 | 37 | 38 | 45 | 51 | 51 |
| | 80:20 | 39 | 40 | 38 | 45 | 52 | 52 |
| | 70:30 | 38 | 35 | 34 | 34 | 43 | 43 |

Table 5 to Table 8 show the use range (SOC %) of the SOC of each of the 24 kinds (cell 1 to cell 24) of the power generating element 60 having the combinations of the four kinds of negative electrode 61 and the six kinds of positive electrode 62. Table 5 shows the case in which the maximum output/input ratio of the vehicle-side system is 1:1 (=1). Table 6 shows the case in which the maximum output/input ratio of the vehicle-side system is 5:4 (=1.25). Table 7 shows the case in which the maximum output/input ratio of the vehicle-side system is 3:2 (=1.5). Table 8 shows the case in which the maximum output/input ratio of the vehicle-side system is 2:1 (=2).

FIG. 6 to FIG. 9 show the relationship between the SOC (the horizontal axis) and the electric power available for input/output.

In each figure, the legend indicates the following. The "LMO-based" refers to the examples among cell 1 to cell 24 in which the positive electrode active material layer includes not less than 80 mass % of lithium manganate ($LiMn_2O_4$). The "NMC-based" refers to the examples among cell 1 to cell 24 in which the positive electrode active material layer includes not less than 80 mass % of a ternary material Li(Ni—Mn—Co)$O_2$ in which a portion of the cobalt of the lithium cobaltate is substituted with nickel and manganese. The "LMO+NMC" refers to the examples among cell 1 to cell 24 other than the LMO-based and the NMC-based examples. In FIG. 6 to FIG. 9, the results pertaining to the respective cells are organized according to the four kinds of negative electrode-1 to negative electrode-4.

Figure 6:
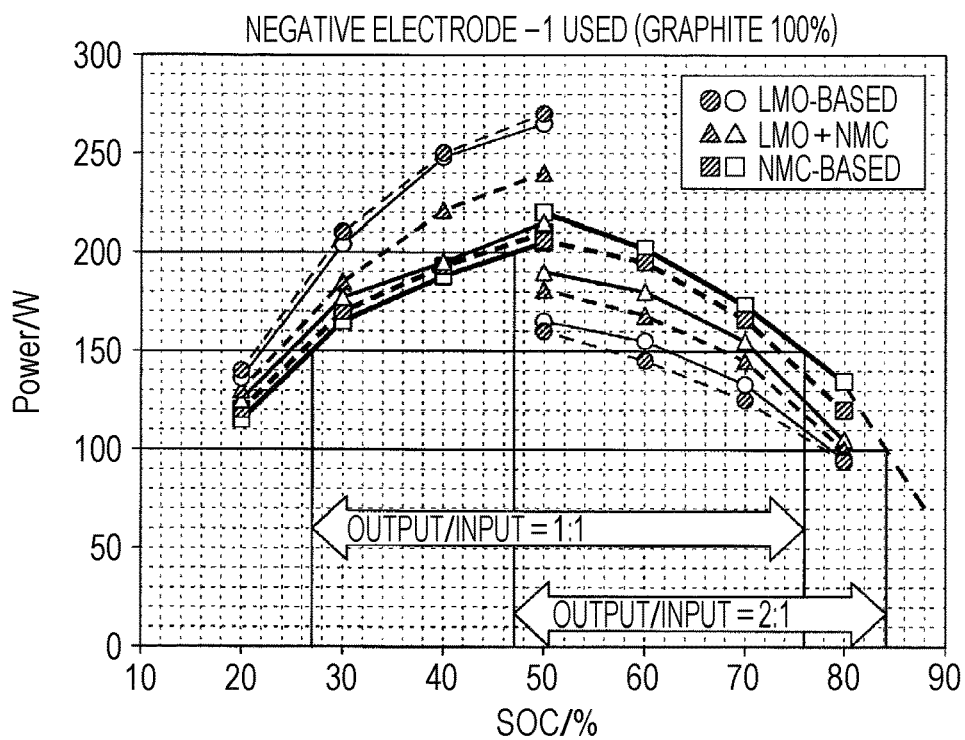
FIG. 6 illustrates an appropriate battery cell selection method according to the present invention.
Figure 7:
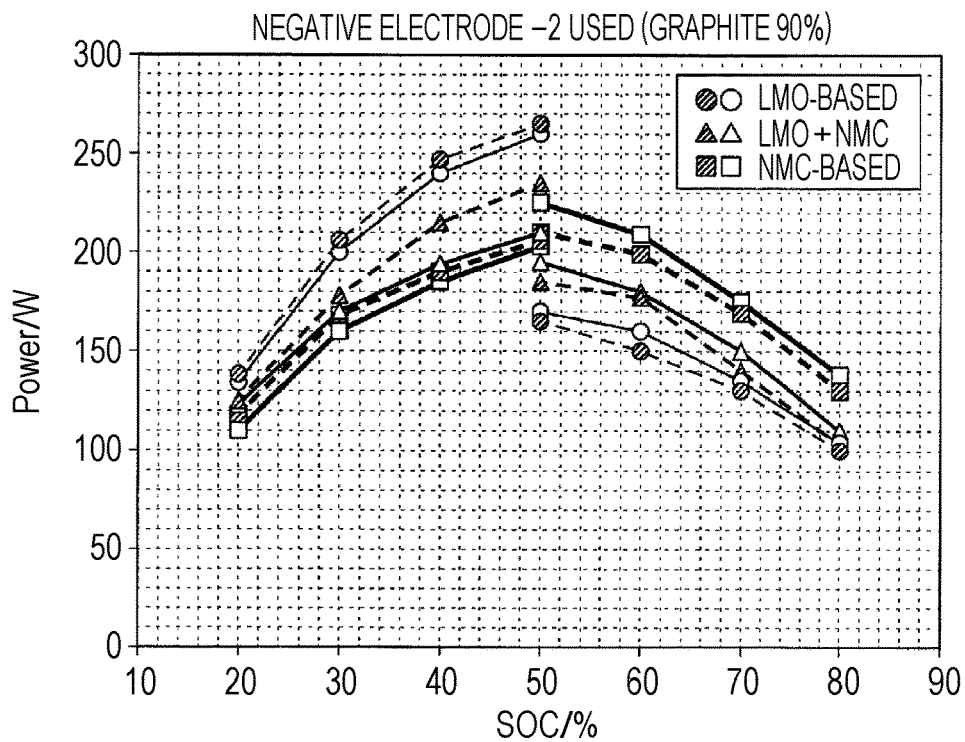
FIG. 7 illustrates an appropriate battery cell selection method according to the present invention.
Figure 8:
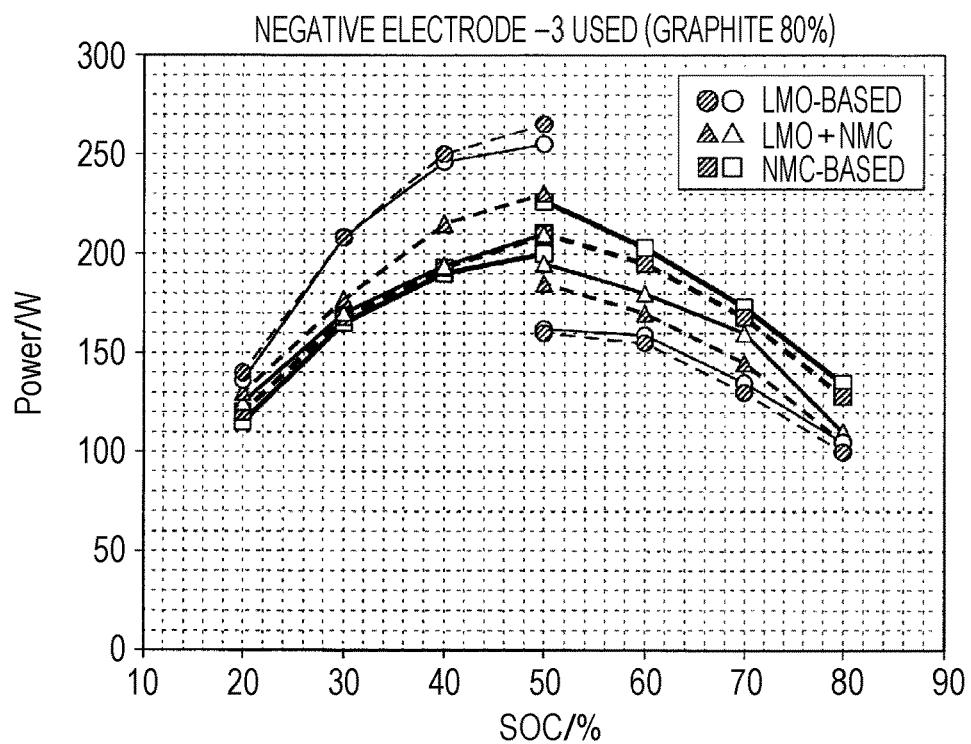
FIG. 8 illustrates an appropriate battery cell selection method according to the present invention.
Figure 9:
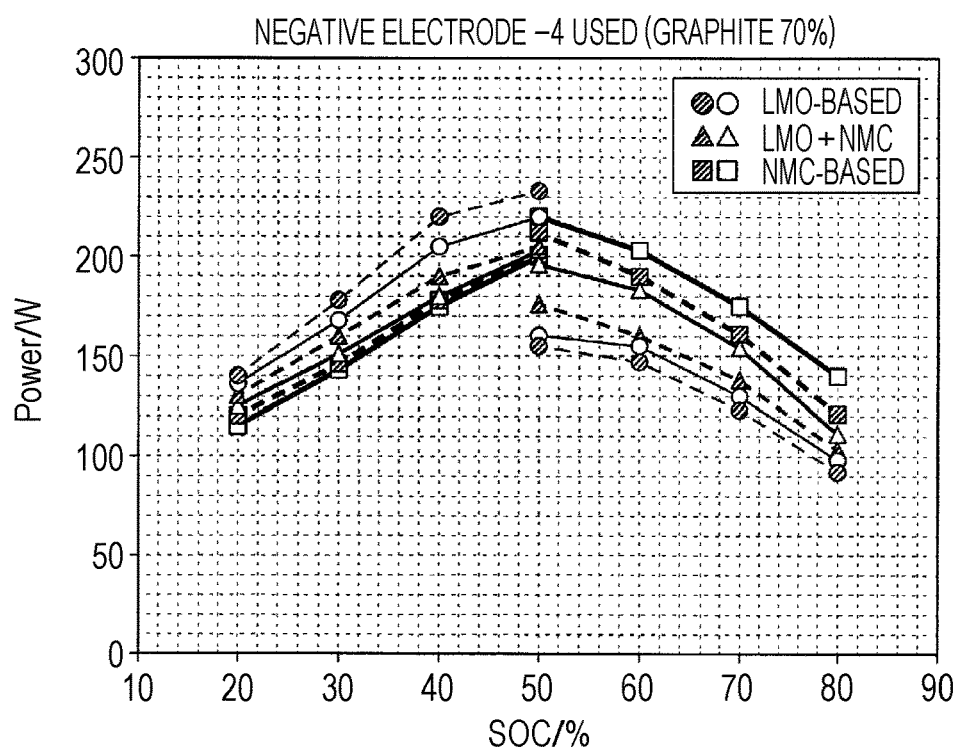
FIG. 9 illustrates an appropriate battery cell selection method according to the present invention.

With reference to the NMC-based cell 1 and cell 2 shown in FIG. 6, Table 4, and Table 8, an appropriate battery cell selection method with respect to the fuel economy-emphasized system will be mainly described. For the system-side appropriateness determination with respect to the other cells, the procedure of determination itself goes through similar steps. Accordingly, only the results of individual determination for the other cells are shown in the tables.

Referring to FIG. 6, the plots indicated by the squares explained in the legend (the two squares, one blank and one with hatching) correspond to the NMC-based cell 1 and cell 2. In the present embodiment, when the maximum output/input ratio on the system side is set, the case in which the maximum output demand value+the maximum input demand value=300 W was set as a reference value on the system side with respect to each of cells 1 to 24.

In this case, the maximum output/input ratio of 1:1 (=1) in Table 5 means that, in an example of the present embodiment, the maximum output demand value and the maximum input demand value are 150 W. Similarly, the maximum output/input ratio of 2:1 (=2) in Table 8 means that the maximum output demand value is 200 W and the maximum input demand value is 100 W. The same applies to the appropriateness determination with respect to the other cells.

Under the set conditions, with reference to FIG. 6, in the NMC-based cell 1 and cell 2, when the maximum output/input ratio is 1:1 (=1), the observed position at which the 150 W line and the plots intersect each other is the SOC of approximately 27% on the output side, and the SOC of approximately 76% on the input side. Thus, it is seen that, with respect to the SOC as a whole of the battery cell, a wide range of around 50% (50% and 49% in Table 5) is obtained as the use range.

On the other hand, in FIG. 6, when the maximum output/input ratio is 2:1 (=1) in the NMC-based cell 1 and cell 2, the observed position at which the 200 W line corresponding to the maximum output demand value intersects the plots is the SOC of approximately 47% on the output side. Meanwhile, the observed position at which the 100 W line corresponding to the maximum input demand value intersects the plots is the SOC of approximately 84% on the input side. Thus, with respect to the SOC as a whole of the battery cell, the use range is limited to a narrow range of around 40% (40% and 39% in Table 8).

Now, the case of mounting in either the fuel economy-emphasized system in which the maximum output demand and the maximum input demand with respect to the battery cell are set at relatively close values, or the output-emphasized system in which the maximum output demand with respect to the battery cell is greater than the maximum input demand is considered.

As noted above, in the NMC-based cell 1 and cell 2, when the maximum output/input ratio is 1:1 (=1), the wide range of around 50% is obtained as the use range of the SOC of the battery cell. Accordingly, the maximum output/input ratio is preferable when an emphasis is put on fuel economy (to suppress wasteful engine operation). Meanwhile, when the maximum output/input ratio is 2:1 (=2), the available SOC range becomes a narrow range of around 40%. Accordingly, the NMC-based cell 1 and cell 2 are comparatively not suitable for the output-emphasized system. In other words, the NMC-based cell 1 and cell 2 have better compatibility with the fuel economy-emphasized system.

The present inventors determined that, in light of the results of the above analysis, in order to enable charging by regeneration in a wide range, it is appropriate that the use range of the SOC of the battery cell in the fuel economy-emphasized system of the present embodiment be not less than 48%, based on the results of a number of experiments.

If the volume is increased in order to increase the input/output values of the battery cell, the battery cell would have input/output margins with respect to the system input/output. When such is the balance between the battery cell input/output and the system input/output demands, the available SOC range of the battery cell would not be changed by selecting the battery cell as according to the present embodiment. Hence, the effect of selecting the battery cell would be absent. Accordingly, it has been determined that, under the limited mounting conditions associated with the hybrid electric vehicle, for example, it is preferable that the maximum input value $P_{in}$, the maximum output value $P_{out}$, the maximum input demand $W_{in}$, and the maximum output demand $W_{out}$ of the lithium ion secondary battery cell satisfy the following (Expression 1). This is because if $(P_{in}+P_{out})/3 \geq (W_{in}+W_{out})$, the demands with respect to the cell input/output would be small and the available SOC range of the battery cell would not be changed regardless of the material system.

$$(P_{in}+P_{out})/3 < (W_{in}+W_{out}) \quad \text{(Expression 1)}$$

It has also been determined that, when a battery cell according to the specifications of the present embodiment is mounted in a fuel economy-emphasized system, it is preferable that the value ($W_{out}/W_{in}$) of the ratio of the maximum output demand $W_{out}$ to the maximum input demand $W_{in}$ with respect to the lithium ion secondary battery cell be less than 1.5.

Based on the above analysis, when similar determinations are made with respect to the other prepared cells, when a demand from a fuel economy-emphasized system in which the value of the ratio of the maximum input demand is less than 1.5 is to be responded, the cells with which 48% or more of an SOC use range can be obtained were the cells indicated in examples 1 to 6 in Tables 3 and 4. The cells are the six kinds of cells (cells 1, 2, 7, 8, 13, 14) enclosed in bold frames in Table 7 and Table 8. In the cells of examples 1 to 6, an SOC use range of not less than 48% can be obtained under the above set conditions. Thus, it has been determined that the cells are preferable for being mounted in a vehicle having the fuel economy-emphasized system.

Meanwhile, when a demand from an output-emphasized system in which the value of the maximum output/input demand ratio is not less than 1.5 is to be responded, the cells with which a use range of not less than 48% can be obtained are the cells of examples A to E in Tables 3 and 4. These battery cells are the six kinds of cells (cells 5, 6, 11, 12, 17, 18) enclosed in bold frames in Table 7 and Table 8. In the cells of examples A to E, the use range of not less than 48% can be obtained under the above set conditions. Accordingly, it has been determined that the cells are preferable for being mounted in a vehicle having the output-emphasized system.

As described above, the hybrid electric vehicle according to the present embodiment includes the fuel economy-emphasized system in which the value of the ratio of the maximum output/input demand with respect to the vehicle power supply is less than 1.5. In the lithium ion secondary battery cell 9A of the battery 9 to be mounted, the configurations of the active material layers of both electrodes are set in predetermined configurations as in examples 1 to 6, in accordance with the maximum demanded output/input ratio on the system side and within the limited volume defined by (Expression 1). Accordingly, the lithium ion secondary battery cell 9A can be used in a wide range of the SOC of the battery cell (not less than 48%) in accordance with the system side of the vehicle. Thus, according to the hybrid electric vehicle of the present embodiment, it becomes possible to utilize a wide range of the SOC of the battery cell to be mounted on the vehicle for a fuel economy-emphasized system. Thus, charging by regeneration can be performed in a wide range.

In addition, according to the lithium ion secondary battery cell selection method described above, a lithium ion secondary battery cell is selected in which the configurations of the active material layers for both electrodes are set in predetermined configurations so that the use range of the SOC of the battery cell becomes wider than a target value, in accordance with the maximum demanded input/output ratio on the vehicle system side. Accordingly, a battery having good compatibility corresponding to the system can be selected.

Thus, by mounting the selected battery on the vehicle, it becomes possible to utilize a wide use-range of the SOC of the lithium ion secondary battery cell in accordance with the vehicle-side system and within a limited volume.

In particular, according to the lithium ion secondary battery cell selection method described above, the NMC-based battery cell, compared with the LMO-based battery cell, has better compatibility with the fuel economy-emphasized system in which the maximum output demand and the maximum input demand with respect to the battery cell are set at relatively close values. Accordingly, it becomes possible to select an NMC-based battery cell correctly and efficiently as a battery cell to be mounted on a vehicle for the fuel economy-emphasized system.

LIST OF REFERENCE NUMERALS

1 Engine
2 Generator
3 Automatic transmission
4 First clutch
5 Second clutch
7L Left drive wheel
7R Right drive wheel
8 Inverter
9 Battery
9A Lithium ion secondary battery cell
20 Accelerator sensor
21 Integrated controller
22 Engine controller
23 Motor controller
24 AT controller
25 Brake controller
26 Battery controller
33 Accelerator pedal
40 Package
51 Negative electrode terminal
52 Positive electrode terminal
60 Power generating element
61 Negative electrode
62 Positive electrode
63 Separator
64 Unit battery cell layer
70 Electrolytic solution

The invention claimed is:

1. A hybrid electric vehicle comprising:
a system for driving a vehicle using a motor and an engine in combination; and
a lithium ion secondary battery cell which drives the vehicle by supplying electric power to the motor in accordance with an input/output demand from the system side, and which is charged by receiving a supply of electric power due to regenerative power generation, wherein:
in the system, a value ($W_{out}/W_{in}$) of a ratio of a maximum output demand $W_{out}$ to a maximum input demand $W_{in}$ with respect to the lithium ion secondary battery cell is set at less than 1.5;

the lithium ion secondary battery cell has a maximum input value $P_{in}$ and a maximum output value $P_{out}$ of the lithium ion secondary battery cell and satisfying, together with the maximum input demand $W_{in}$ and the maximum output demand $W_{out}$, $(P_{in}+P_{out})/3<(W_{in}+W_{out})$ (Expression 1);

the lithium ion secondary battery cell includes a positive electrode active material layer including not less than 80 mass % of a ternary material Li(Ni—Mn—Co)O$_2$ in which a portion of the cobalt of the lithium cobaltate is substituted with nickel and manganese; and the lithium ion secondary battery cell includes a negative electrode active material layer including not less than 80 mass % of graphite.

2. The hybrid electric vehicle according to claim 1, wherein
the lithium ion secondary battery cell has an output (W) and a capacity (Wh) in a ratio of the output (W) to the capacity (Wh) having a value (W/Wh) of not less than 25.

3. The hybrid electric vehicle according to claim 1, wherein
the system subjects the lithium ion secondary battery cell to charge/discharge control so that a 50% SOC is at the center of SOC variations.

4. The hybrid electric vehicle according to claim 1, wherein
the positive electrode active material layer has a nickel (Ni) ratio of 30 to 50 mass %.

5. A lithium ion secondary battery cell selection method for a hybrid electric vehicle as a method for selecting the lithium ion secondary battery cell to be mounted in the hybrid electric vehicle, the method comprising:
selecting, based on the value ($W_{out}/W_{in}$) of a ratio of a maximum demanded output $W_{out}$ to a maximum demanded input $W_{in}$ with respect to a lithium ion secondary battery cell, which ratio is set in advance on a system side of the hybrid electric vehicle, a material and a content of a positive electrode active material layer and a content of graphite used in a negative electrode active material layer of the lithium ion secondary battery cell so that a use range of the SOC of the battery cell becomes wider than a target value.

6. The lithium ion secondary battery cell selection method for the hybrid electric vehicle according to claim 5, the method comprising:
when the value ($W_{out}/W_{in}$) of the ratio of the maximum demanded output $W_{out}$ to the maximum demanded input $W_{in}$ with respect to the lithium ion secondary battery cell is not less than 1.5,
selecting the lithium ion secondary battery cell which includes the positive electrode active material layer including not less than 80 mass % of lithium manganate (LiMn$_2$O$_4$), and the negative electrode active material layer including not less than 80 mass % of graphite; and
when the value ($W_{out}/W_{in}$) of the ratio of the maximum demanded output $W_{out}$ to the maximum demanded input $W_{in}$ with respect to the lithium ion secondary battery cell is less than 1.5,
selecting the lithium ion secondary battery cell which includes the positive electrode active material layer including not less than 80 mass % of a ternary material Li(Ni—Mn—Co)O$_2$ in which a portion of the cobalt of the lithium cobaltate is substituted with nickel and manganese, and the negative electrode active material layer including not less than 80 mass % of graphite.

* * * * *